Jan. 23, 1934.                C. W. H. HOLMES                  1,944,643
              APPARATUS FOR SEPARATION OF DRY MATERIALS
                      Filed Aug. 20, 1930           4 Sheets-Sheet 1
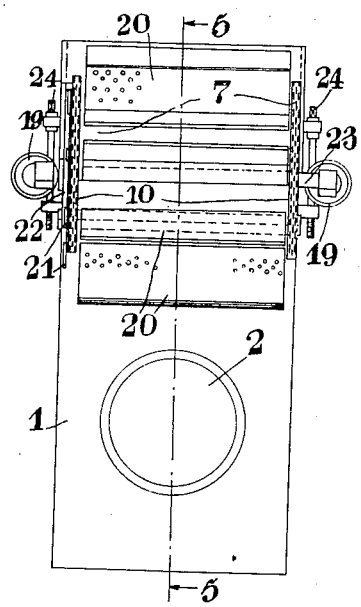
Fig.11.
Fig.4.
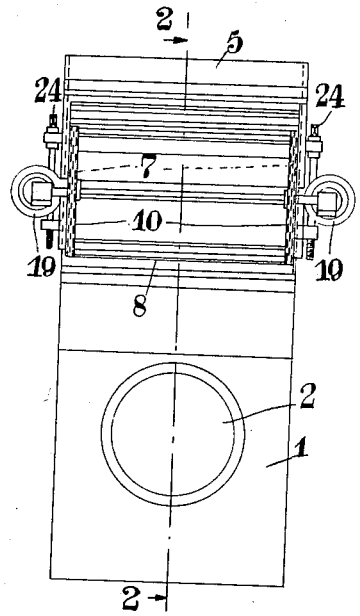
Fig.1.
C. W. H. Holmes
INVENTOR
By: Marks & Clerk
Att'ys.

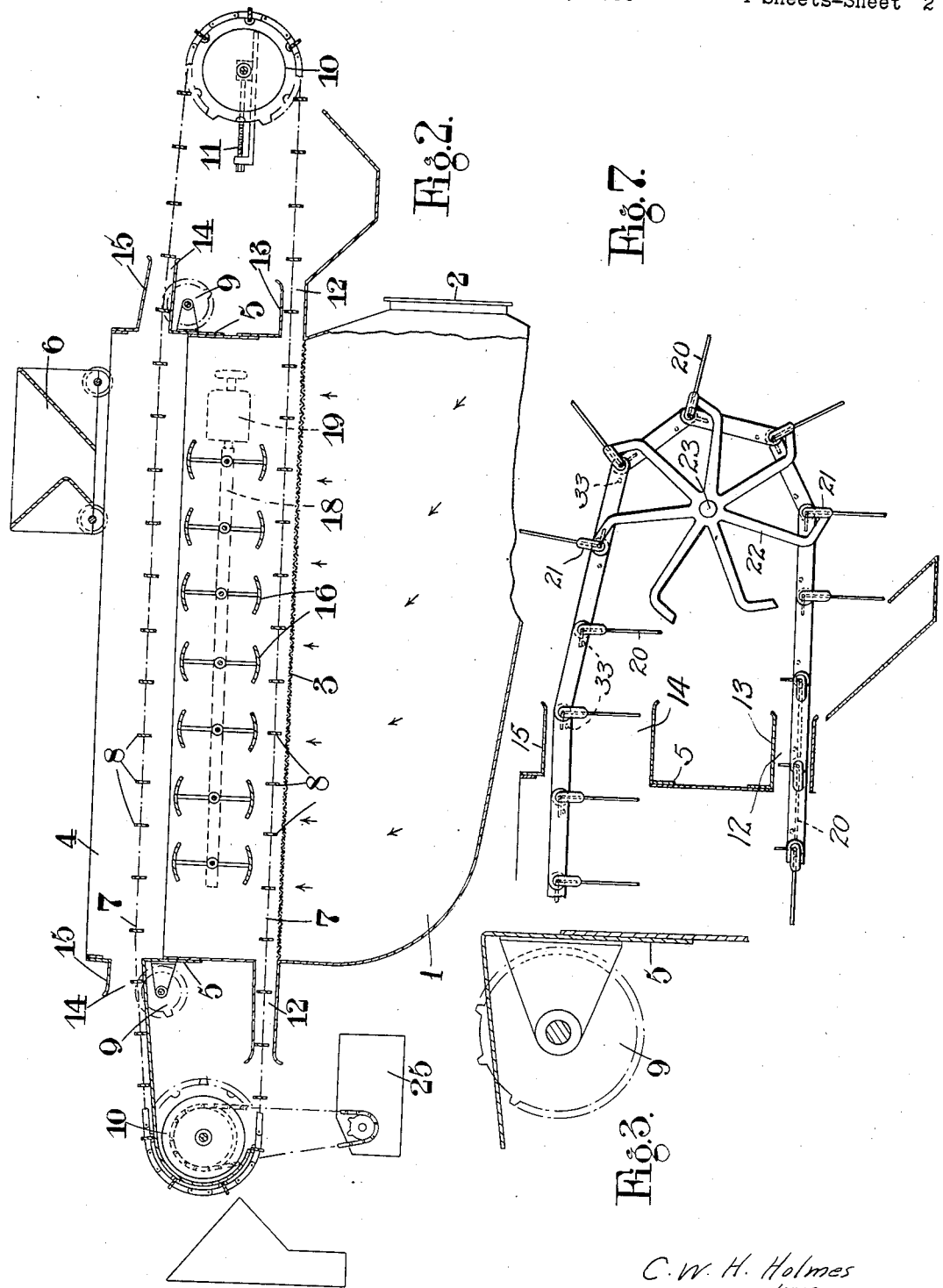

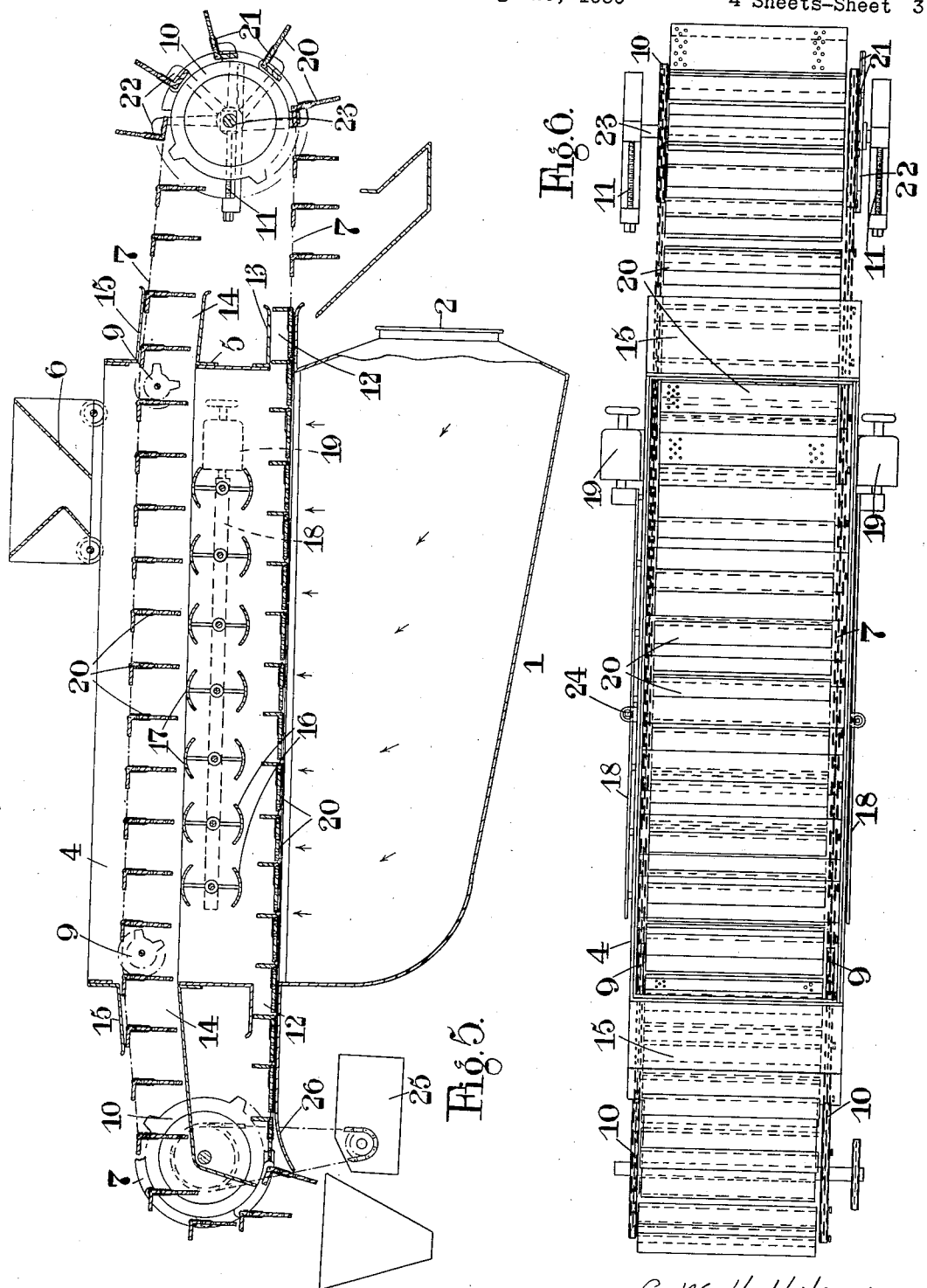

Jan. 23, 1934.  C. W. H. HOLMES  1,944,643
APPARATUS FOR SEPARATION OF DRY MATERIALS
Filed Aug. 20, 1930  4 Sheets-Sheet 4
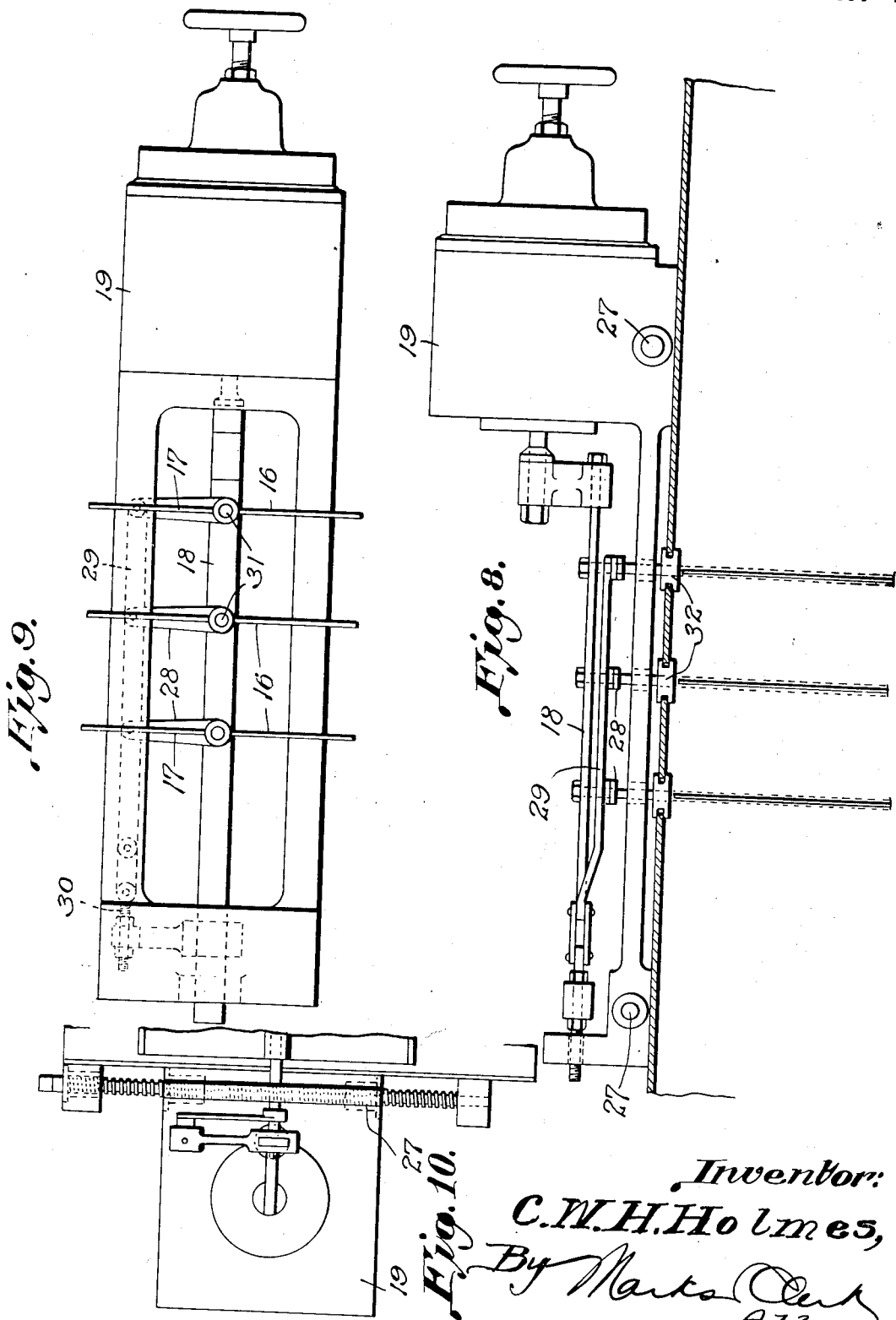
Inventor:
C. W. H. Holmes,
By Marks Clerk
Attys.

Patented Jan. 23, 1934

1,944,643

UNITED STATES PATENT OFFICE 1,944,643

APPARATUS FOR SEPARATION OF DRY MATERIALS

Colin William Higham Holmes, Low Fell, England, assignor of one-half to The Birtley Iron Company Limited, Birtley, England Application August 20, 1930, Serial No. 476,602, and in Great Britain August 28, 1929

2 Claims. (Cl. 209—474)

This invention relates to the separation of substantially dry materials and is particularly directed to the separation of slate or other impurities or refuse from coal, that is to the dry cleaning of coal but it is not limited thereto and includes the cleaning and grading of agricultural and mineral products and the like.

The invention relates more specifically to apparatus for the separation of substantially dry materials upon a stationary or unidirectional moving horizontal air pervious surface, the mass being rendered substantially fluid by means of an air pressure beneath the bed either continuous or pulsating, such apparatus being provided with mechanical means whereby the upper stratum of material consisting of the lighter components of the mass and the lower stratum comprising the heavier components of the mass are constrained to move in parallel opposite and horizontal directions.

In previous forms of apparatus for the separation of dry materials the pervious surfaces have been either stationary and inclined, reciprocating and inclined, or reciprocating and substantially horizontal, and the stratified products have been moved from the point where the raw material is fed to the separator to the points of discharge of the various products either by the jigging motion of the separator or by gravity or by a combination of both.

The object of the invention is to provide improved or modified arrangements for the separation of substantially dry materials by virtue of the differences in densities of the component parts of the mass.

The object of the invention is also to provide means whereby the efficiency of such separation may be increased more especially in connection with the treatment of materials in the substantially unsized condition.

The object of the invention is further to maintain a separation of increased efficiency without the necessity of reciprocating large and heavy masses.

The invention in brief consists in apparatus for the separation of dry materials wherein the material is fed into a substantially rectangular trough having an air pervious bottom, substantially vertical and continuous sides, and ends which are either inclined to the horizontal or which are provided with ports or apertures for the removal of the separated products as indicated herein.

The invention also consists in apparatus according to the preceding paragraph in which is provided a continuous chain scraper or propelling conveyor or the like the under strand of which travels along the upper surface of the pervious bottom of the trough.

The invention also consists in apparatus according to the preceding two paragraphs in which is provided a continuous chain scraper or propelling conveyor whose upper or return strand travels through the trough in a substantially horizontal line.

The invention further consists in apparatus according to the preceding three paragraphs in which is provided means whereby the vertical height between the forward and return strands of the conveyor may be adjusted whilst it is in motion.

The invention further consists in apparatus according to the preceding four paragraphs in which is provided means whereby the transverse or scraping or propeling members of the conveyor may be made to slide or tilt in such a manner as to have a greater or less vertical height dependent on whether such members are functioning in the forward or return strands of the conveyor chain.

The invention further consists in the provision of one or more vertical grids, plates, or the like, which are arranged in the trough at right angles to its length and which extend substantially across the trough in a horizontal direction, but which are of such a height as to enable the conveyor to pass both under and above them.

The invention further consists in the means whereby the depth of such grids, plates or the like may be varied.

The invention further consists in the application of a reciprocation or vibration to such grids or plates.

The invention further consists in the provision of means whereby the height of the side walls of the trough may be varied independently of the vertical adjustment of the return strand of the continuous chain scraper or propelling conveyor.

The invention further consists in the provision of means whereby a difference in air pressure either continuous or pulsating may be maintained between the upper and lower surfaces of the bed of material to be treated.

The invention further consists in the provision of positively variable gear by means of which the speed of any moving part or parts of the apparatus may be varied at will.

The invention also consists in the provision of electrical or mechanical means whereby the rate of discharge of one or both of the products may be controlled by the depth of the lower stratum of separated material within the trough, or, alternatively, by the relative depths of the two separated strata in the trough.

The invention also consists in the provision of means whereby the location of the feed of the raw material may be varied along the length of the trough.

The invention also consists in apparatus for the separation of substantially dry materials substantially as herein described.

Referring to the accompanying diagrammatic drawings:—

Figure 1 is an end elevation,

Figure 2 is a sectional side elevation of one form of apparatus on line 2—2 of Figure 1, Figure 3 is a detail of a guide roller, Figure 4 is an end elevation of a modification, Figure 5 is a sectional side elevation of Figure 4 on the line 5—5 of Figure 4 looking in the direction of the arrows, Figure 6 is a plan of Figure 5, Figure 7 is a detail of one method of reversing conveyor plates.

Figures 8, 9 and 10 are fragmentary plan view, elevation and end views respectively, of the baffle guides and vibrators.

Figure 11 is a fragmental detail view of the perforated plates and their mountings.

Like reference numbers in the various figures refer to like parts.

In carrying the invention into effect in the form illustrated by way of example, in Figures 1 to 3 a mixture of coal and shale is fed into the open top of the trough and flows over the pervious bottom where it is acted upon by the air pressure and is rendered fluid, thereby causing the shale to sink to the bottom and the coal to rise to the top. The components having been stratified are now separated in horizontal, parallel and opposite directions, the lowest stratum of shale being conveyed along the bottom of the trough by one strand of the scraper or propelling conveyor and the other stratum of coal being conveyed in a parallel opposite direction by the return strand of the scraper or propelling conveyor.

The height of the vertical grids or plates within the trough is so adjusted as to admit of the functioning of both strands of the conveyor without mechanical interference and provides a barrier which limits the vertical height of material influenced by either strand of the conveyor chain, and also provides a continuous vertical zone or bed of material in between two separated products.

In practice it is preferable to vibrate or reciprocate these grids or plates and thereby increase the fluidity of this zone as far as possible by mechanical means and without the use of an excessive escapement of air through the bed.

In a preferred form of the invention one conveyor is used, its forward strand conveying the lower heavy stratum and its return strand conveying the lighter upper stratum in the opposite direction. Each stratum may, however, be acted upon by a separate conveyor. In the form illustrated in Figures 1 to 3 there is provided an air box 1 having an opening 2 for the admission of air which may be supplied either continuously or in pulsations, preferably by a fan or other suitable means. A stationary air pervious surface 3 is fixed horizontally to the top of the air box 1. Above the air pervious surface 3 a trough is formed by side plates 4 and end plates 5. These side and end plates are so arranged that the depth of the trough may be varied by means of adjusting screws 24. The material to be separated is fed into the trough by means of a hopper or chute 6. The position of this hopper may be varied in a lengthwise direction. The trough is of sufficient length to allow the material to stratify under the action of the air current, which breaks the angle of repose, the particles stratifying under the combined action of the air pressure and movement of the bed, the heavier particles falling through the mass. These particles are removed by the lower strand of a conveyor which is formed of chains 7 and cross plates 8. The upper strand of the conveyor passes through the bed at or near the surface in a direction opposite to the lower strand. This upper strand may have its position varied to suit the thickness of the bed, this adjustment being carried out by means of guide rollers 9.

The conveyor is driven by means of a preferably positively variable speed gear box 25 through sprocket wheels 10, the tension of the conveyor being adjusted by means of a screw tension gear 11 or other suitable means.

The lower ends of the trough have outwardly extending chambers 12 through which the lower strand of the conveyor chain passes, thus forming an air seal. Where the lower strand of the conveyor chain leaves the trough the upper portion 13 of the chamber 12 is made adjustable so that the amount of heavier material removed may be varied. Where the upper strand of the conveyor enters and leaves the trough extension pieces 14 are fitted to form a guide for the entrance of the conveyor cross plates 8.

The upper portion 15 of the delivery mouthpiece 14 is adjustable so that the amount of the lighter particles delivered from the trough may be varied.

Baffle guides 16 and 17 are placed across the trough and are made independently adjustable. These plates are mounted on a frame 18 which is attached to vibrators 19. The vibrators 19 and frame 18 are carried on adjusting screws 27, by which means the position of the baffles may be adjusted relative to the depth of bed. The angle of the baffle plates may be adjusted by means of arms 28 and link 29, operated by screw 30. In order to seal the spindles 31 where they pass through the side plates 4, sealing plates 32 may be provided. The frame 18 may also be raised or lowered in the trough as required.

In the modification shown in Figures 4 to 7 one conveyor is used consisting of pervious plates with upstanding scraper ribs the height of such ribs being relatively small compared with the length of the pervious plates. These units are connected together by means of a chain or chains and on the forward strand they form a combination of pervious bottom and scraper or propelling conveyor, whilst on the return side arrangements are made whereby each unit tilts, providing means whereby a greater depth of the upper stratum may be removed in comparison with the depth of the lower stratum that is removed by means of the upstanding ribs. For example, such an arrangement is of advantage in separating shale from coal where the depth of the upper stratum preponderates.

In the drawings Figures 4 to 7 the air pervious surface is formed of perforated plates 20 so arranged that as they travel along the bottom of the trough they form a continuous pervious surface, the short side of the plate being turned upwardly to form a propelling medium for the heavier particles. The plates on leaving the trough fall by gravity into a position such that the longer portion projects downwardly.

Arms 21 are attached to the end of the pivot pin of the plates 20 and are arranged to engage with a spider 22 which is mounted on the sprocket shaft 23 thus carrying the plates radially from the centre until they reach a position over the vertical when they fall through 180°, the long side again taking up a vertical position and thus passing into the upper portion of the trough. Thus the spider 22 lifts the plates 20 from the bottom to the top of the trough. At the forward end of the conveyor these plates retain a vertical position due to gravity and upon re-entering the trough are guided into their horizontal positions by means of a curved or sloping plate 26. As the arm 21 disengages from the spider 22, the plate 20 again falls into the vertical position where the scraper rib engages with a stop pin 33, a clearance slot 34 allowing the plate 20 to pass the stop pin 33.

In a preferred form of the invention one conveyor is used consisting of pervious plates with upstanding scraper ribs the height of such ribs being relatively small compared with the length of the pervious plates. These units are connected together by means of a chain or chains and on the forward strand they form a combination of pervious bottom and scraper or propelling conveyor, whilst on the return side arrangements are made whereby each unit tilts, providing means whereby a greater depth of the upper stratum may be removed in comparison with the depth of the lower stratum that is removed by means of the upstanding ribs. For example, such an arrangement is of advantage in separating shale from coal where the depth of the upper stratum preponderates.

General

The invention is not limited to the above example and modifications may be made in design, construction, size or arrangement of the means for producing the maximum efficiency.

As regards the frame 18, it is not essential that this should be reciprocated in a horizontal direction, or only in a horizontal direction. One of the functions of this frame and its associated parts is to assist in causing fluidity of the mass; another function is to stop interference between the counter movements of the upper and lower sets of blades.

According to a modification a stationary frame 18 may be employed.

Means may also be provided for removing dust created during the process.

A plurality of units may be used in series for the purpose of retreating one or more products delivered from a prior unit or units.

Apparatus according to the present invention may be used in a process for the separation of dry materials wherein screening or sizing appliances are interposed between the various units substantially as described in application No. 312,717 filed on the 15th day of October, 1928.

Having now described my invention, what I claim as new and desire to secure by Letters Patent is:—

1. Apparatus for the separation of substantially dry materials comprising in combination a substantially horizontal trough, means for supplying air pressure beneath said trough, a conveyor band, part in upper part of said trough, and part in the lower part of the aforesaid trough, propelling members on both parts of said band and means for causing these propelling members to tilt so as to have a greater or less vertical height dependent on whether such members are functioning as the upper or lower parts of said conveyor.

2. Apparatus for the separation of substantially dry materials comprising in combination a substantially horizontal trough, means for supplying air pressure beneath said trough, a continuous conveyor band, part situated in the upper part of said trough and part situated in the lower part of the aforesaid trough, propelling members pivoted to said conveyor, said members consisting of arms at right angles one substantially longer than the other, a sprocket wheel at one end of the conveyor for driving the conveyor, a sprocket wheel at the other end of the conveyor for driving the conveyor, a spider at one end of the conveyor adapted to engage the aforesaid propelling members and to prevent their tilting under the action of gravity as they are lifted from the bottom of the trough to the top of the trough.

COLIN WILLIAM HIGHAM HOLMES.